United States Patent [19]

Reitmayer

[11] 4,325,133

[45] Apr. 13, 1982

[54] DISC PLAYER APPARATUS

[76] Inventor: Gustav Reitmayer, Turmstrasse 27, 7630 Lahr 1, Fed. Rep. of Germany

[21] Appl. No.: 129,227

[22] Filed: Mar. 11, 1980

[30] Foreign Application Priority Data

Mar. 12, 1979 [DE] Fed. Rep. of Germany ....... 2909564

[51] Int. Cl.³ .............................................. G11B 3/60
[52] U.S. Cl. ..................... 369/263; 248/638
[58] Field of Search ............... 369/264, 263; 248/605, 248/638, 619

[56] References Cited

U.S. PATENT DOCUMENTS

| | | | |
|---|---|---|---|
| 2,247,651 | 7/1941 | Carson | 369/263 |
| 2,325,807 | 8/1943 | Stephan | 369/263 |
| 2,932,482 | 4/1960 | Dickie | 248/619 |
| 2,962,289 | 11/1960 | Greene | 369/263 |
| 3,927,888 | 12/1975 | Van der Lely | 369/263 |

Primary Examiner—John W. Shepperd
Attorney, Agent, or Firm—Fleit & Jacobson

[57] ABSTRACT

A disc player apparatus comprises a resiliently mounted chassis carrying a sound pickup and a turntable. The chassis is restricted to five degrees of freedom comprising two degrees in two mutually perpendicular lateral directions, a degree in a vertical direction normal to the turntable and two degrees of rotational freedom about axes disposed in the two lateral directions.

15 Claims, 5 Drawing Figures

DISC PLAYER APPARATUS

BACKGROUND OF THE INVENTION

A known form of disc player apparatus or phonograph, which may be used for example and more particularly in broadcasting studios, comprises an oscillating or floating support chassis which is resiliently mounted or suspended in or on a base means. The chassis carries a sound pickup assembly and a turntable which is driven by a motor, directly or for example by means of a belt.

A regular or scheduled broadcast is under pitiless pressures of time, as for example, the transmission must be precisely blended in to programs in the course of being transmitted, or it must be possible directly to start connection operations without any loss of time. It is therefore essential that the time required for the turntable of a record or disc player to reach the required rated speed or rotation is as short as possible. The use of the most modern drive principles, that is to say, using a light turntable, a low-inertia rotor in the drive motor and direct drive, permits optimum rapid starting and rapid stopping of the turntable. It will be appreciated however that, in the event of rapid starting and rapid stopping in this way, considerable reaction moments occur, and these may give rise to a detrimental rotational oscillation of the support chassis on its resilient suspension or mounting, about an axis (generally referred to as the Z-axis) perpendicular to the turntable and on the axis of rotation thereof.

Purely lateral or vertical moments can always be compensated by a dynamically balanced pickup arm. On the other hand, it has not been possible hitherto to compensate for rotational moments as referred to above because the mass of the pickup arm cannot be kept at zero. The above-mentioned rotational oscillatory or vibratory movements have an interference effect on the sound pickup operation and produce unpleasant fluctuations in synchronism or smoothness of motion or in the pitch produced, particularly in the starting operation.

SUMMARY OF THE INVENTION

An object of the present invention is to provide a phonograph which avoids the above-discussed disadvantages of the prior art.

A further object of the invention is to provide a phonograph or disc player wherein the above-mentioned rotational oscillatory movements about the axis (Z-axis) which is perpendicular to the turntable and which is on the axis of rotation thereof are reduced to a minimum or completely eliminated.

In a phonograph or disc player apparatus, these and other objects are achieved by the oscillating or floating support chassis having a resilient mounting or suspension which restricts it to five degrees of freedom of movement, namely two degrees of freedom in two mutually perpendicular lateral directions (referred to as the X-direction and the Y-direction), a degree of freedom in a vertical direction (referred to as the Z-direction), which is perpendicular to the turntable, and two degrees of freedom of rotational movement about two axes (referred to as the X-axis and the Y-axis) which are disposed in the two lateral directions.

Such limitation to the above-mentioned five degrees of freedom can be achieved by means of an oscillating system which is form-lockingly and force-lockingly connected to the chassis, that is to say, connected to the chassis by virtue of a positive interconnection of appropriate shaped components and by virtue of a connection produced by a force such as a clamping or gripping force. Damping or isolating means may be provided in such an arrangement, at the points of connection between the oscillating system and the chassis.

The oscillating system may have two interconnected spring systems, comprising a first spring system which has resiliency in a vertical direction and one lateral direction and which is connected to the chassis, and a second spring system which has resiliency in a vertical direction and the other lateral direction and which is connected to the base of the phonograph. The apparatus may have a frame for interconnecting the two spring systems, and the spring systems may engage the frame laterally thereon.

The spring systems may be of such a nature that the frequency of oscillation of the chassis in a vertical direction differs from the frequency or frequencies of oscillation in the two lateral directions.

The spring systems are preferably in the form of beam springs or spring bars which act as supports or struts in the direction of the axes of the respective bars, and the spring systems may be arranged in a single plane in order to give the flattest possible construction. It will be appreciated however that it is alternatively possible for the spring bars to be disposed in different planes. Preferably, a spring system comprises two parallel spring bars, with a pair of spring bars of one spring system extending normal to the pair of spring bars of the other system. The spring bars of the pairs may engage the sides of the frame by means of which the spring bars of the two spring bar systems are interconnected. The frame may be of a circular or annular configuration, in which case the spring bars may extend tangentially with respect to the circumference of the frame.

In order to produce different oscillation frequencies in respect of the chassis in the vertical and lateral directions and in the horizontal direction respectively, the spring bars may have different moments of inertia about their respective bending axes. It is also advantageous for the centre of mass of the chassis to coincide with the centre of mass of the oscillating system.

The spring bars may be extended beyond the points at which they are connected to the frame and then the ends of the spring bars of one spring system are secured to the base means and the ends of the spring bars of the other system are secured to the chassis, so that it is possible to avoid the use of an additional spring means which is operative in a vertical direction to support the chassis.

By virtue of the arrangement according to the invention, the reaction moments which occur under quick-start and quick-stop conditions are transmitted into the base means of the phonograph. This arrangement makes it possible substantially to reduce the times required to bring the turntable up to speed and to stop the turntable, and to prevent subsequent oscillation about the above-mentioned Z-axis.

DESCRIPTION OF THE PREFERRED EMBODIMENTS

Figure 1:
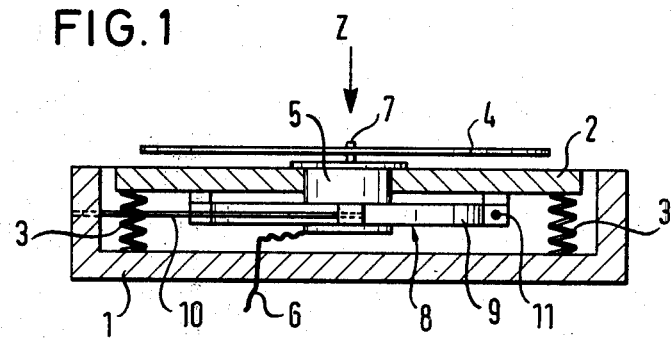
FIG. 1 shows a diagrammatic view of part of a first embodiment of the apparatus in section along line I—I in FIG. 2.
Figure 2:
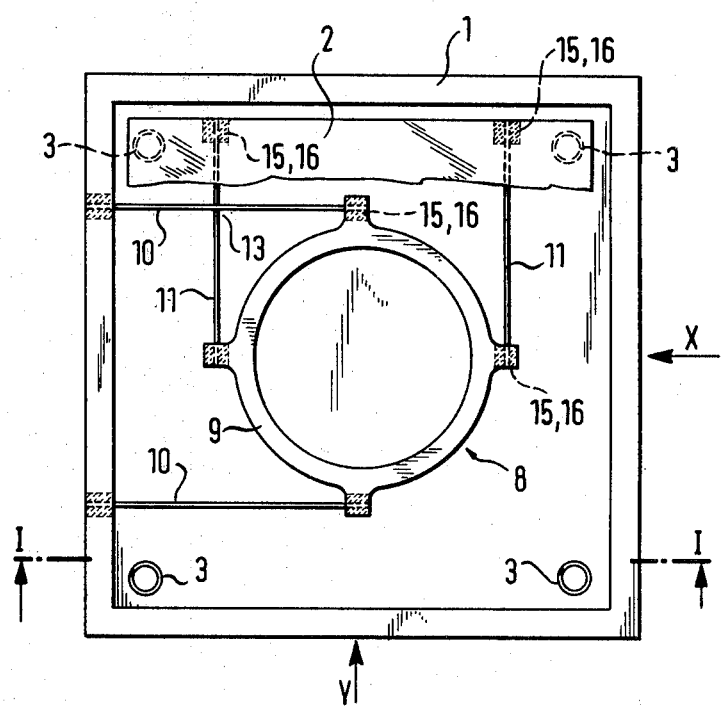
FIG. 2 shows a plan view of the FIG. 1 apparatus, a part of the chassis, the turntable and motor having been omitted for the sake of enhanced clarity.

Reference will first be made to FIGS. 1 and 2 which show a first embodiment of a record player apparatus or disc phonograph embodying the principles of the present invention. As shown, the apparatus comprises a support base means 1 and an oscillating or floating chassis 2 which is floatingly mounted on or suspended in the base means 1, on for example four coil springs 3. The chassis 2 carries a rotary turntable 4 which can be driven in rotation by means of a motor 5, for example directly as shown or by way of a belt. The motor 5 is supplied with power by way of a supply line 6. A disc to be played is laid on the turntable 1, being centered in the usual way by a motor shaft extension portion 7. The resilient suspension or mounting of the chassis 2 is restricted to five degrees of freedom by means of an oscillating system 8 which is form-lockingly and force-lockingly connected to the chassis 2. The five degrees of freedom are two degrees of freedom in the two lateral directions, referred to as the X-direction and the Y-direction (see FIG. 2), a degree of freedom in a vertical direction, referred to as the Z-direction (see FIG. 1) and two degrees of freedom of rotational movement about the X-axis and the Y-axis. Damping or isolating means 15 may be disposed at the points of connection, as indicated at 16, between the system 8 and the chassis 2.

The system 8 for restricting the resilient suspension or mounting of the chassis 2 to the five degrees of freedom preferably comprises a frame 9 which, in the illustrated embodiment, is of a round or annular configuration. The frame 9 is connected to the base means 1 of the apparatus by way of a pair of supports or struts comprising beam springs or spring bars 10 having resiliency in a vertical direction and in the lateral Y-direction. The frame 9 and the chassis 2 are connected by a pair of supports or struts which also comprise beam spring bars 11 having resiliency in a vertical direction and in the lateral X-direction. The spring bars 10 and 11 respectively may preferably have different moments of inertia about their respective bending axes. By virtue of this arrangement, for example flexing movements of the spring bars 10 and 11 or oscillatory movements of the chassis 2 in a vertical direction may oscillate at a frequency different from the frequency in the lateral or horizontal direction. In this arrangement, the centre of mass of the oscillating system 8, that is to say, the spring bars 10 and 11, and the frame 9, coincides with the centre of mass of the oscillating chassis 2 of the motor 5 including the turntable 4.

Figure 5:
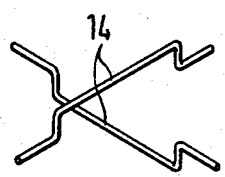
FIG. 5 shows a perspective view of a position at which two steel spring bars cross over each other.

As shown in FIGS. 1 and 2, a first pair of spring bars 10 is fixedly gripped by means of first ends thereof to the base means 1, the second ends being connected to the frame 9. The other pair of spring bars 11 is fixedly gripped by its first ends to the chassis, while the second ends are connected to the frame 9. The spring bars 10 extend perpendicularly to the spring bars 11 (see FIG. 2). The pairs of spring bars 10 and 11 are preferably disposed in one plane. In such an arrangement, at the points at which the spring bars cross over each other, one or both of the intersecting bars 10 and/or 11 may have a slightly curved portion 14, as shown in FIG. 5, so that the spring bars are not in contact with each other.

Figure 3:
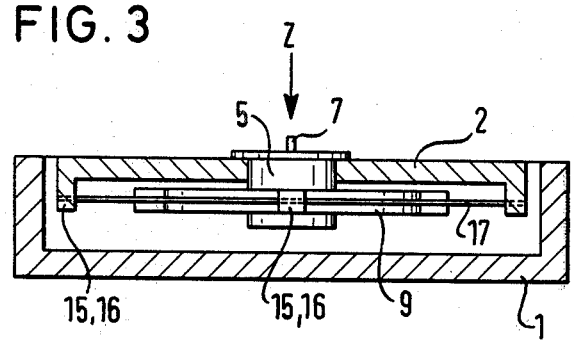
FIG. 3 shows a diagrammatic view of part of a second embodiment in section along line III—III in FIG. 4.
Figure 4:
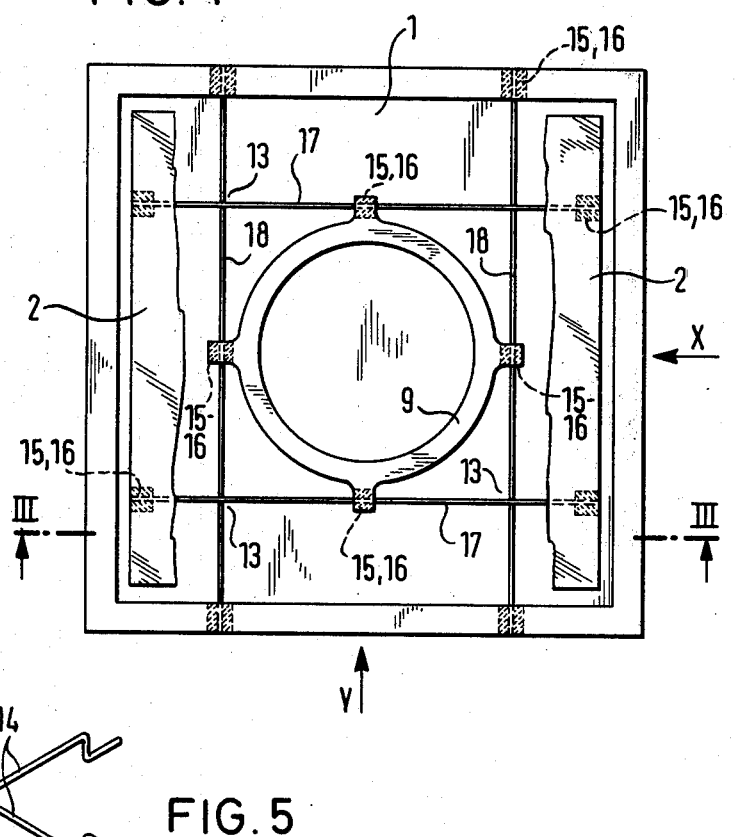
FIG. 4 shows a plan view of part of the FIG. 3 apparatus.

Reference will now be made to FIGS. 3 and 4 showing a further embodiment of the apparatus of the invention. This apparatus is generally similar to the embodiment of FIGS. 1 and 2 except that the spring bars 18 are extended beyond their connecting points 16 to the frame 9, and are then connected to the base means 1, and the spring bars 17 are also extended beyond the connecting points 16 on the frame 9, to the chassis 2. In such an arrangement, the spring mounting 3 for the chassis 2, as shown in FIGS. 1 and 2, can be omitted as the arrangement of FIGS. 3 and 4 makes it possible to provide the required resilient mounting of the chassis 2 solely by means of the pairs of support members 17 and 18.

Apparatus of the constructions described above are well suited to use in broadcasting by virtue of eliminating or at least substantially reducing the detrimental effects of the prior apparatuses as discussed above.

Various modifications and alterations may be made in the present invention without thereby departing from the scope and spirit thereof.

I claim:

1. In an apparatus for the reduction of vibrations in a disc player comprising means for forming a base (1), an oscillating chassis (2) carrying a sound pick-up system, a turn-table, and a motor driving the turn-table; and means for resiliently supporting the oscillating chassis on the base, the improvement wherein:

first and second mutually normal pairs of spring bars (10, 11 and 17, 18, respectively), each with two parallel spring bars (10 and 11, and 17 and 18, respectively), that cooperate to resiliently support the oscillating chassis (2);

means for mounting first ends of the first pair of spring bars (10 and 18, respectively) on the base (1);

means for mounting first ends of the second pair of spring bars (11 and 17, respectively) on the oscillating chassis (2);

frame means for interconnecting portions of the two pairs of spring bars disposed between the base and chassis; and the spring bars (10, 11 and 17, 18, respectively,) and the frame means (9) form an oscillating system having a center of inertia that coincides with the center of inertia of the oscillating chassis (2), motor, and turntable.

2. Apparatus according to claim 1, wherein the oscillating system is connected to the chassis in such manner that the oscillating system is operable to restrict movement of the chassis of five degrees of freedom comprising two degrees of freedom in two mutually normal lateral directions, a degree of freedom in a vertical direction normal to the turntable, and two degrees of rotational freedom about axes which are disposed in the two lateral directions.

3. Apparatus according to claim 2 comprising damping means located at connections between the oscillating system and the chassis for damping movement of the oscillating system.

4. Apparatus according to claim 2 comprising isolating means located at connections between the oscillating system and the chassis for isolating said chassis from movement of said oscillating system.

5. Apparatus according to claim 2 wherein said first pair of spring bars has resiliency in a vertical direction and one said lateral direction and the second pair of spring bars has resiliency in the vertical direction and the other said lateral direction.

6. Apparatus according to claim 5 wherein said pairs of spring bars are disposed in substantially the same plane.

7. Apparatus according to claim 2 wherein the resiliency of said first and said second pairs of spring bars are selected such that frequency of oscillation of the chassis in the vertical direction differs from at least one oscillation frequency in the two lateral directions.

8. Apparatus according to claim 1 wherein the spring bars of said first and said second pairs have different moments of inertia about their respective bending axes.

9. Apparatus according to claim 1 wherein the pairs of spring bars intersect with at least one of a pair of intersecting spring bars having a displaced portion at the intersection to provide an arrangement without mutual contact between the spring bars.

10. Apparatus according to claim 1 wherein ends of said spring bars are connected to said frame means.

11. Apparatus according to claim 1 wherein the spring bars are extended beyond their connections to said frame means.

12. Apparatus according to claim 11 wherein the spring bars which are extended beyond said frame means connections along form the resilient support of the chassis.

13. In an apparatus for the reduction of vibrations in a disc player comprising means for forming a base (1), an oscillating chassis (2) carrying a sound pick-up system, a turn-table, and a motor driving the turn-table; and coil spring means positioned between the base and chassis for floatingly mounting the chassis on the base, the improvement wherein:
first and second mutually normal pairs of spring bars, each with two parallel spring bars (10 and 11), resiliently support the oscillating chassis (2);
the base includes means for mounting first ends of the first pair of spring bars (10) on the base (1);
the chassis includes means for mounting first ends of the second pair of spring bars (11) on the oscillating chassis (2);
frame means are disposed between the base and chassis for interconnecting the two pairs of spring bars, second ends of said first and said second pairs of spring bars being connected to said frame means so that the spring bars (10, 11) and the frame means (9) form an oscillating system having a center of inertia that coincides with the center of inertia of the oscillating chassis (2), motor, and turntable.

14. In an apparatus for the reduction of vibrations in a disc player comprising means for forming a base (1), an oscillating chassis (2) carrying a sound pick-up system, a turn-table, and a motor driving the turn-table; and means for resiliently and floatingly supporting the chassis on the base, the improvement wherein said means for resiliently and floatingly supporting comprises:
first and second mutually normal pairs of spring bars, each with two parallel spring bars (17 and 18);
means for mounting the first pair of spring bars (18) on the base (1);
means for mounting the second pair of spring bars (17) on the oscillating chassis (2);
frame means disposed between the base and chassis for interconnecting the two pairs of spring bars so that the spring bars (17, 18) and the frame means (9) form an oscillating system having a center of inertia that coincides with the center of inertia of the oscillating chassis (2), motor, and turntable; and
both ends of the first pair of spring bars being mounted on the base and both ends of the second pair of spring bars being mounted on the oscillating chassis so that said frame means is supported by said first pair of spring bars intermediate the ends thereof and said first pair of spring bars floatingly mounts the chassis on the base.

15. An apparatus for reducing vibrations in a disc player having a base and an oscillating chassis; a sound pick-up system, a turn-table, and a motor for driving the turn-table being carried by the oscillating chassis, said apparatus comprising:
a first pair of parallel spring bars;
a second pair of parallel spring bars extending normal to said first pair of parallel spring bars;
frame means connected to each of said spring bars intermediate the ends thereof;
means for mounting ends of said first pair of spring bars on said base so that said frame means is located under a central portion of the oscillating chassis; and
means for mounting ends of said second pair of parallel spring bars on said oscillating chassis so that said first and said second pairs of parallel spring bars, together with said frame means, form an oscillating system operable to restrict movement of the chassis, the oscillating system floatingly mounting the chassis on the base.

* * * * *